US007663865B2

(12) United States Patent
Toia et al.

(10) Patent No.: US 7,663,865 B2
(45) Date of Patent: Feb. 16, 2010

(54) ELECTROLYTIC CAPACITORS COMPRISING MEANS IN THE FORM OF A MULTILAYER POLYMERIC SHEET FOR THE SORPTION OF HARMFUL SUBSTANCES

(75) Inventors: Luca Toia, Carnago VA (IT); Marco Amiotti, Cornaredo MI (IT)

(73) Assignee: Saes Getters S.p.A., Lainate MI (IT)

( * ) Notice: Subject to any disclaimer, the term of this patent is extended or adjusted under 35 U.S.C. 154(b) by 103 days.

(21) Appl. No.: 12/091,999

(22) PCT Filed: Nov. 30, 2006

(86) PCT No.: PCT/IT2006/000831

§ 371 (c)(1),
(2), (4) Date: Apr. 29, 2008

(87) PCT Pub. No.: WO2007/066372

PCT Pub. Date: Jun. 14, 2007

(65) Prior Publication Data

US 2009/0225496 A1    Sep. 10, 2009

(30) Foreign Application Priority Data

Dec. 6, 2005    (IT)    .......................... MI2005A2344

(51) Int. Cl.
*H01G 9/00*    (2006.01)
(52) U.S. Cl. .................. 361/523; 361/525; 361/528; 361/529; 361/503; 361/512
(58) Field of Classification Search ................. 361/523, 361/516–519, 525, 528–529, 540–541, 301.1, 361/508–512; 29/25.01, 25.03
See application file for complete search history.

(56) References Cited

U.S. PATENT DOCUMENTS

| 3,491,269 | A | 1/1970 | Booe |
| 5,057,972 | A | 10/1991 | Ishii |
| 7,092,238 | B2 * | 8/2006 | Saito et al. .................. 361/329 |
| 7,154,739 | B2 * | 12/2006 | O'Phelan ..................... 361/508 |
| 7,167,353 | B2 * | 1/2007 | Yuyama et al. ............. 361/502 |
| 7,196,899 | B1 * | 3/2007 | Feger et al. .................. 361/512 |
| 7,385,802 | B1 * | 6/2008 | Ribble et al. ................. 361/508 |
| 7,529,076 | B2 * | 5/2009 | Saito et al. ............... 361/301.5 |

FOREIGN PATENT DOCUMENTS

| EP | 1 107 336 A2 | 6/2001 |
| JP | 3-292712 A | 12/1991 |

(Continued)

*Primary Examiner*—Nguyen T Ha
(74) *Attorney, Agent, or Firm*—Panitch Schwarze Belisario & Nadel LLP

(57) ABSTRACT

Electrolytic capacitors are provided having an airtight housing, electrodes immersed in an electrolytic solution, electrical contacts connected to the electrodes, and a device for sorption of harmful substances. The device is made of a multilayer polymeric sheet (10), which is formed of an inner layer (12) of polymeric material, containing particles of one or more getter materials (11) for sorption of the harmful substances, and at least one protective layer (13) of a polymeric material impermeable to the electrolyte. All of the polymeric materials are permeable to the harmful substances.

19 Claims, 3 Drawing Sheets

FOREIGN PATENT DOCUMENTS

| | | |
|---|---|---|
| JP | 2001167988 A | 6/2001 |
| JP | 2003-197487 | 7/2003 |
| JP | 2003197487 A | 7/2003 |
| JP | 2004193251 A | 7/2004 |
| WO | 01/16971 A1 | 3/2001 |
| WO | 2006/123389 A1 | 11/2006 |

* cited by examiner

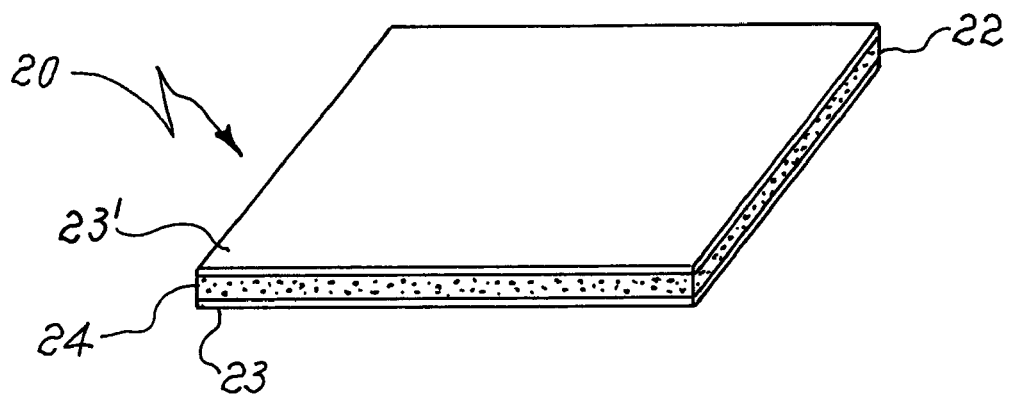
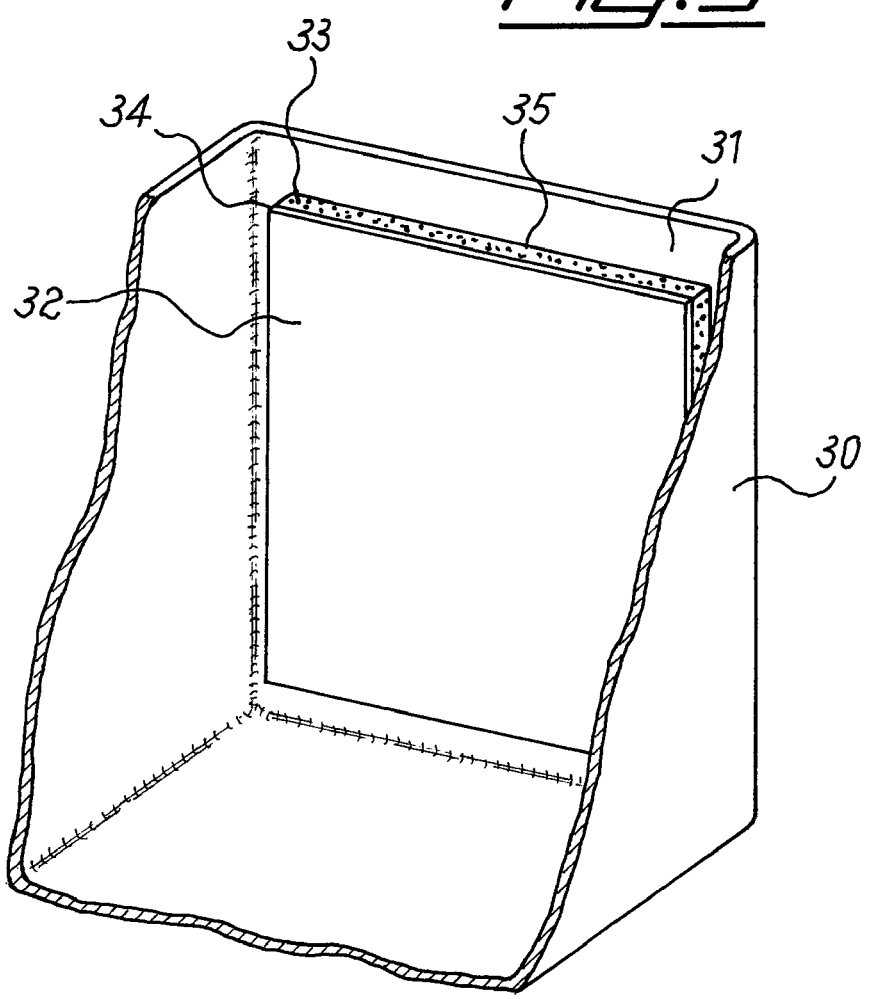

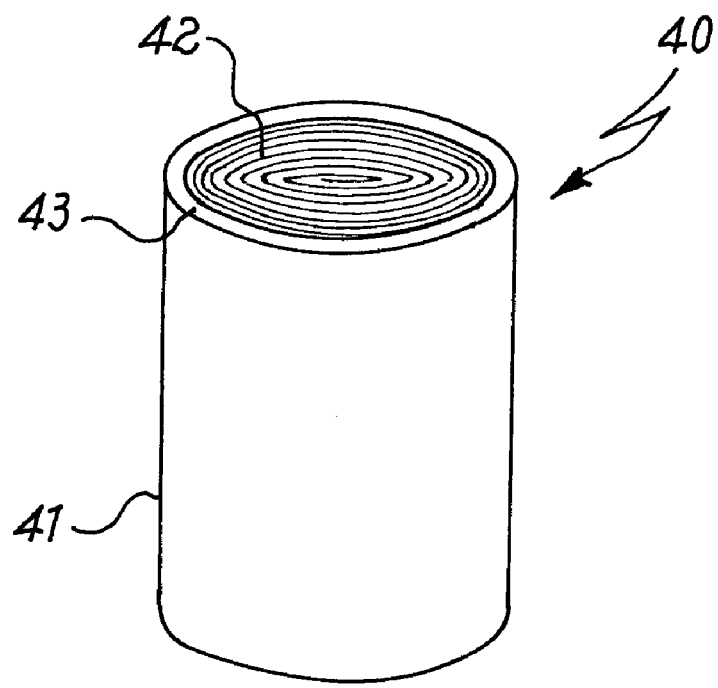
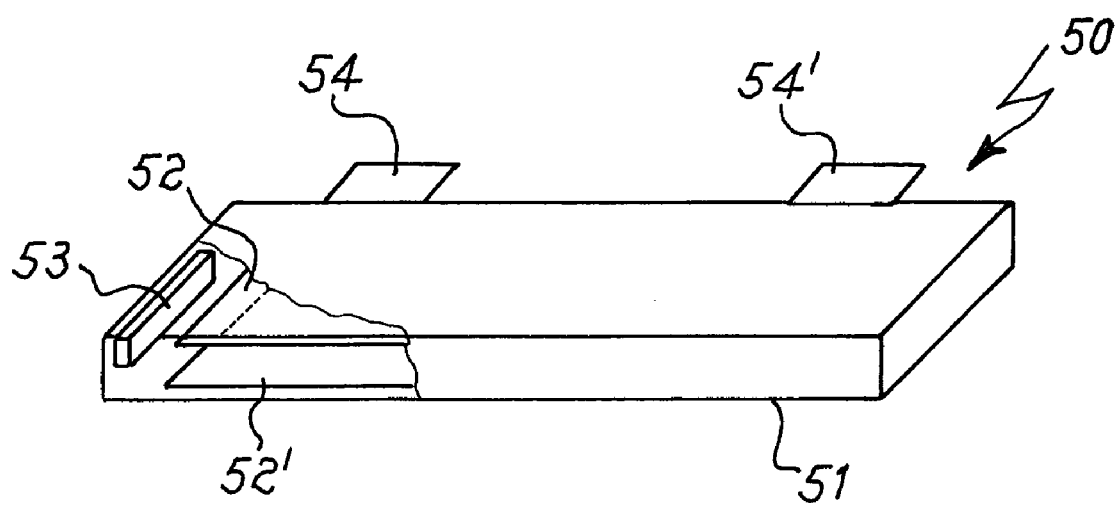

ELECTROLYTIC CAPACITORS COMPRISING MEANS IN THE FORM OF A MULTILAYER POLYMERIC SHEET FOR THE SORPTION OF HARMFUL SUBSTANCES

CROSS-REFERENCE TO RELATED APPLICATIONS

This application is a Section 371 of International Application No. PCT/IT2006/000831, filed Nov. 30, 2006, which was published in the English language on Jun. 14, 2007, under International Publication No. WO 2007/066372 A3 and the disclosure of which is incorporated herein by reference.

BACKGROUND OF THE INVENTION

The present invention relates to electrolytic capacitors containing a device for sorbing the harmful substances created by such capacitors during their use. The present invention also relates to a method for sorption of the substances.

Known electrolytic capacitors, e.g. EDLC supercapacitors (Electrochemical Double Layer Capacitor), are essentially comprised of an airtight housing, wherein electrodes typically formed of metal sheets are arranged, the electrodes being immersed in particular electrolytic solutions. The housing also contains gettering elements for sorption of harmful substances, and electrical contacts communicating the electrodes with the outside of the capacitor.

The electrolytic solutions are typically formed of a solvent and an ionic salt. In the EDLC case, for example, acetonitrile and propylene carbonate are frequently employed as solvents, while tetraethylammonium tetrafluoroborate is often used as a salt.

During use, these solutions can create harmful substances, often in gaseous form, which can damage the capacitors, possibly in an unrepairable manner. Another possible source of harmful gases can be due to the desorption of some materials used inside the capacitor.

Carbon dioxide, carbon monoxide, and hydrogen are among the most harmful gaseous species; while water, which is another particularly harmful species, is typically present in liquid form inside the electrolytic solution.

The problem of the sorption of harmful species inside the capacitors can be tackled by adding one or more sorbing elements mixed in the electrolytic solution, or by non-mixed sorbing systems. The use of materials with a gettering action mixed in the electrolyte can be accomplished by liquid sorbers. This solution is disclosed, for example, in International patent application PCT/IT2006/000349 of SAES Getters S.p.A. A second embodiment prescribes the use of solid sorbers added to the electrolyte, as described in Japanese patent application publication JP 03-292712, wherein an additive including a particulate of platinum, palladium or alloys thereof is applied onto the sheets after these have been impregnated with the electrolytic solution. However, these sheets may have a very small thickness, in particular less than 10 micrometers ($\mu$m), whereby the sheets may be damaged by the particles contained in such a particulate, due to their relatively large diameter, resulting in the risk of accidental short-circuits within the capacitor.

A system employing gas sorbers placed in delimited regions of the capacitor is described in Japanese patent application publication JP 2003-197487. In this case, the sorbing material is used in the form of sheets of a polymeric material, such as polypropylene, as a support of the sorbing material. These sheets are directly contacted by the electrolytic solution.

These types of solution are limited by the fact that the sorbing material, in addition to having the function of sorbing the harmful substances produced within the capacitor, must be compatible with the electrolyte, i.e., it must be completely inert with respect thereto, in order to prevent its sorbing properties from being jeopardized, or even worse, in order to prevent chemical species harmful to the correct operation of the capacitor being released as an effect of the reaction with the electrolyte. For example, the possible decomposition of the gas sorber could vary the electric conductivity of the electrolyte. Such a compatibility must be guaranteed by the sorber, even after the sorber has carried out its function by binding with the harmful species.

BRIEF SUMMARY OF THE INVENTION

In a first aspect thereof, the present invention relates to an electrolytic capacitor able to overcome the problems still present in the prior art, and particularly comprises an electrolytic capacitor comprising an airtight housing, electrodes immersed in an electrolytic solution, electrical contacts connected to the electrodes and a device for sorption of harmful substances, characterized in that the device for sorption of harmful substances is a multilayer polymeric sheet formed of an intermediate layer of polymeric material containing particles of one or more getter materials for sorption of the harmful substances, and at least one external protective layer of polymeric material impermeable to the electrolyte, wherein all the polymeric materials are permeable to the harmful substances.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a plan perspective view of an alternative embodiment of a device according to the invention for sorption of harmful substances in electrolytic capacitors;

FIG. 3 is a partially cut-away, perspective view of a portion of the walls of an electrolytic capacitor, to which a device for sorption of harmful substances is fixed according to an embodiment of the present invention;

FIG. 4 is a cross sectional, perspective view of an electrolytic capacitor containing a device for sorption of harmful substances, in the form of a multilayer polymeric sheet according to an embodiment of the invention; and FIG. 5 is a schematic, perspective view of a second embodiment of an electrolytic capacitor containing a device for sorption of harmful substances, in the form of a multilayer polymeric sheet according to an embodiment of the invention.

Figure 1:
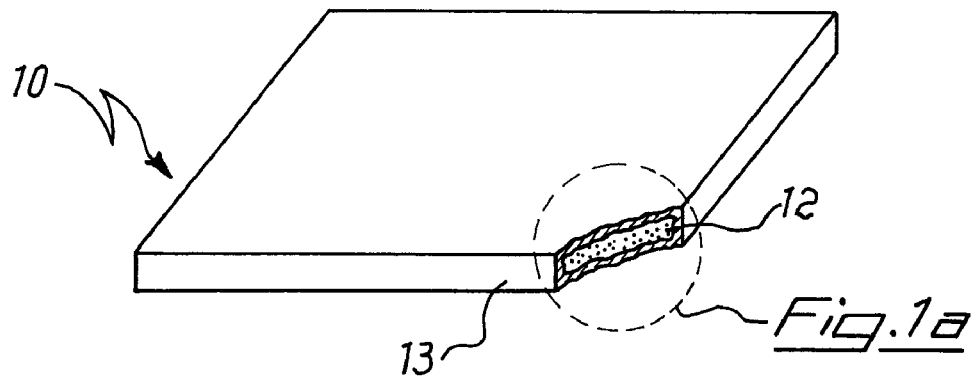
FIG. 1 is a partially cut-away, plan perspective view a first embodiment of a device according to the invention for sorption of harmful substances in electrolytic capacitors.

The size and the size ratios of the various elements shown in the drawings are not correct, having been altered in order to help the understanding of the same drawings.

DETAILED DESCRIPTION OF THE INVENTION

In order to manufacture the electrolytic capacitors of the invention, it is necessary that the device for sorption of harmful substances be provided with at least one protective layer of polymeric material, i.e., permeable to the harmful species but impermeable to the electrolyte, covering at least one of the two main surfaces of the intermediate layer containing the getter particles.

Figure 1A:
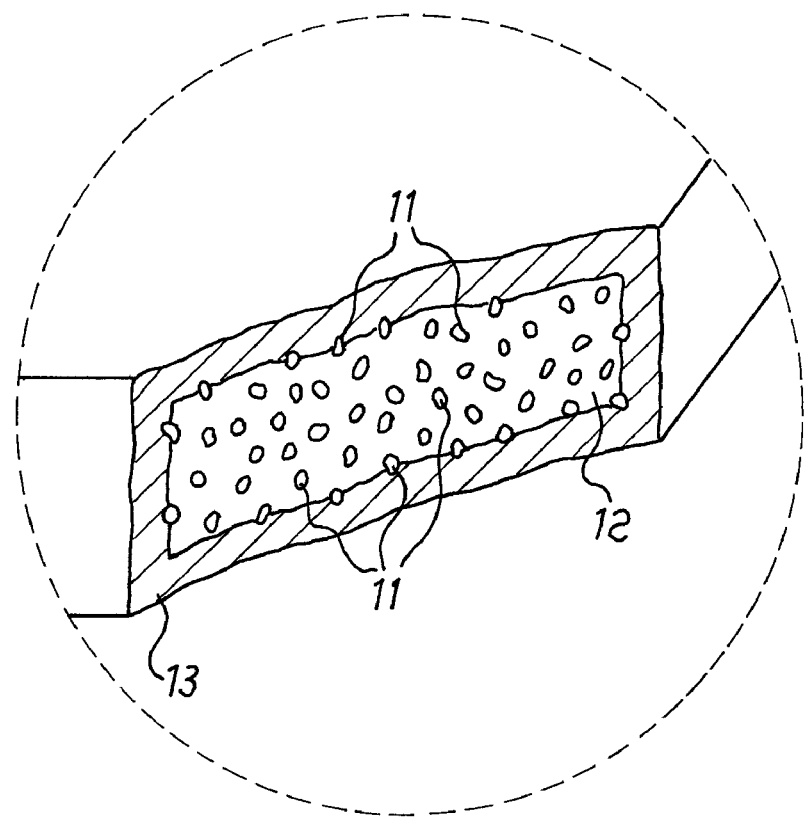
FIG. 1a is an enlarged detail view from the circled portion of FIG. 1.

FIG. 1 and the enlargement of a detail thereof in FIG. 1a show in a partial cut-away view, a multilayer polymeric sheet 10 for sorption of harmful substances in electrolytic capacitors. Getter material particles 11 are dispersed in a layer 12 of a polymeric material permeable to gases, which is in turn completely enclosed in a continuous layer 13 of a polymeric material permeable to gases but impermeable to the electrolyte, thereby protecting the getter material from contact with the electrolyte. This allows a free choice of getter material, regardless of the type of electrolyte used inside the capacitor.

Alternatively, the protective polymeric coating only partially covers the inner polymeric layer containing the getter material.

In a first embodiment according to this modality, represented in FIG. 2, the device for sorption of harmful substances is in a form of a multilayer sheet 20, comprising a layer 22 of a polymeric material containing the getter material and two layers, 23 and 23', of protective polymeric material laid against the two main surfaces of layer 22, but leaving unprotected the edge 24 of layer 22. The small dimensions of surface 24 exposed to the electrolyte do not jeopardize the functionality of the whole system.

Finally, in case the device for sorption of harmful substances is laid against an inner wall of the casing of the capacitor, there is no need for a protective layer between the layer containing the getter material and such inner wall, the protection only being necessary for the surface facing the electrolyte. This situation is represented in FIG. 3, showing a portion of the casing 30 of a capacitor (a flat wall is exemplified, but any other useful shape is possible). Against an inner surface 31 of the casing is adhered (e.g., by melt welding) a device 32 for sorption of harmful substances. Device 32 is formed by a layer 33 containing getter particles, and a protective layer 34 permeable to the harmful substances but not to the electrolyte. Device 32 is represented in a configuration similar to that described for sheet 20, namely with the edge 35 of layer 33 exposed to the electrolyte, but layer 34 could be fixed to surface 31 along the whole perimeter of layer 33, so as to completely surround and protect the latter (this last alternative embodiment is not shown in the drawings).

Layers of polymeric material containing particles of getter material are described in International patent application publication WO 2005/107334A1 concerning the purification of the inner atmosphere of electroluminescent organic screens. However, such layers containing getter material are without a protective polymeric layer, which is of key importance to carry out the present invention.

Sheets formed of a layer of polymeric material comprising getter material and a protective layer, being of polymeric material as well, are described in U.S. Pat. No. 5,091,233. In this case, these materials are used for the manufacturing of evacuated panels, and the aim of the polymeric film protecting the getter material is to slow down the permeation of gaseous substances, rather than carrying out a selective permeation protecting the same getter material as in the present invention.

The inner polymeric layer containing the getter material may be manufactured by an extrusion process and subsequent rolling of a batch of material including the polymer in semi-solid condition and particles of getter material as uniformly dispersed therein as possible. In order not to jeopardize the plasticity characteristics of the layer containing the getter material, the weight percentage of the particles of one or more getter materials must not be higher than 95%, and in a preferred embodiment it must be lower than 85%.

As to the materials forming the protective polymeric layer(s), the inventors have found that materials suitable for carrying out the invention are polytetrafluoroethylene (PTFE) and polyolefins, in particular polyethylene and especially low-density polyethylene (LDPE).

These materials are also suitable for manufacturing the polymeric layer containing the getter material. In a preferred embodiment, the same type of polymer is used both to manufacture the polymeric layer containing the getter material and to manufacture the protective layer(s).

The layers of polymeric material forming the multilayer sheet may be joined to one another by various processes widely known in the field, e.g., by multilayer extrusion, multilayer rolling or pressure die casting.

The getter materials used in the device according to the invention are of various kinds, depending on the harmful substances to be removed from the inside of the capacitor. The nature of these substances may be ascertained, for any kind of capacitor, by preliminary tests carried out analyzing the gas developed during operation by different types of capacitors without any means for removing gases.

When the harmful substance is hydrogen, it is possible to use non-evaporable getter alloys, particularly the zirconium-vanadium-iron alloys described in U.S. Pat. No. 4,312,669 and sold by SAES Getters S.p.A. under the trademark St 707, or the zirconium-cobalt-RE alloys (RE stands for Rare Earths) described in U.S. Pat. No. 5,961,750 and sold by SAES Getters S.p.A. under the trademark St 787. It is also possible to use unsaturated organic compounds (possibly along with hydrogenation catalysts), zeolites with a silver deposit or carbon nanotubes. Finally, it is possible to use materials that react with hydrogen forming water, such as palladium oxide (PdO) or cobalt(II,III) oxide ($Co_3O_4$), in combination with $H_2O$ sorbers.

In case the harmful substance is $H_2O$, it is possible to use as getter materials alkaline earth metals oxides (preferred is calcium oxide), boron oxide or zeolites.

In case the harmful substance is carbon dioxide, suitable getter materials are lithium hydroxide, alkaline-earth metals hydroxides, or lithium salts such as $LiXO_y$, where X is chosen among zirconium, iron, nickel, titanium and silicon and y is between 2 and 4.

In case the harmful substance is carbon monoxide, it is possible to use cobalt(II,III)oxide ($Co_3O_4$), copper(II) oxide (CuO), or potassium permanganate ($KMnO_4$), preferably along with a $CO_2$ sorber.

The device for sorption of harmful substances for use in the electrolytic capacitors of the present invention may also include more than one getter material, depending on the harmful substances needed to be removed from the capacitor. For example, in capacitors where the solvent is acetonitrile, hydrogen production mainly occurs, whereby it is advisable to use a composition with more getter material for such a gas, whereas in the case where the solvent is propylene carbonate, a larger amount of particles must be used to sorb CO and $CO_2$.

The particles of getter material must have a grain size less than 150 μm, preferably between 25 and 50 μm in the case of non-evaporable getter alloys, between about 1 and 25 μm in the case of salts, oxides or zeolites, and less 1 mm when using carbon nanotubes or organic compounds.

The thickness of the two polymeric layers forming the getter system is another very relevant parameter. In particular, the thickness of the polymeric layer containing the getter material must be between 5 and 200 μm, depending on the grain size of the particles of getter material (in particular, this thickness must be greater than the dimension of the getter particles), and preferably between 10 and 100 μm, while as to the external protective layer, its thickness may be between 1 and 50 μm, preferably between 2 and 20 μm.

The electrolytic capacitors of the present invention are preferably manufactured by placing the getter system for sorption of harmful substances along one or more internal walls of the airtight housings, or portions thereof.

For example, FIG. 4 shows a cross sectional view of an electrolytic capacitor 40 of cylindrical shape, comprising an airtight housing 41 inside of which are present electrodes in the form of thin sheets coiled to form a spiral 42 immersed in a liquid electrolyte (not shown). A multilayer sheet 43 is arranged against the inner wall of such a capacitor. The sheet may be any of the kinds described with reference to FIGS. 1, 2 and 3. The electrolytic capacitor shown in FIG. 4 shows a cylindrical geometry, but such a geometry is not compulsory for manufacturing devices of the invention. For instance, another geometrical shape preferred for these capacitors is a parallelepiped.

In FIG. 5 another preferred geometry for the EDLC capacitors is shown. In this case, the structure of the electrolytic capacitor 50 includes a plurality of electrodes 52, 52', . . . , (only the outermost two are shown in the drawing for sake of clarity) in the form of parallel metal plates, immersed in an electrolytic solution (not shown). On one side of such a capacitor the device 53 for sorption of harmful gases is arranged. The electrical contacts 54 and 54' communicate the electrodes with the outside of the airtight housing 51 of the electrolytic capacitor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An electrolytic capacitor (40; 50) comprising an airtight housing (41; 51), electrodes (52; 52'; ...) immersed in an electrolytic solution, electrical contacts (54; 54') connected to the electrodes and a multilayer polymeric sheet (10; 20; 32; 43; 53) for sorption of harmful substances, the multilayer polymeric sheet comprising an inner layer (12; 22; 33) of polymeric material containing particles (11) of at least one getter material for sorption of harmful substances and at least one external protective layer (13; 23, 23'; 34) of polymeric material impermeable to the electrolytic solution, wherein all of the polymeric materials are permeable to the harmful substances, and wherein:

when the harmful substances comprise hydrogen, the getter material is at least one selected from non-evaporable getter alloys, unsaturated organic compounds, zeolites with a silver deposit, carbon nanotubes, palladium oxide, and cobalt(II,III) oxide;

when the harmful substances comprise $H_2O$, the getter material comprises at least one compound selected from alkaline-earth metal oxides, boron oxide and zeolites; and when the harmful substances comprise CO, the getter material comprises at least one compound selected from the following: cobalt(II,III) oxide, copper(II) oxide and potassium permanganate.

2. The electrolytic capacitor according to claim 1, wherein the external protective layer completely covers the inner layer apart from at most an edge (24; 35) of the inner layer.

3. The electrolytic capacitor according to claim 1, wherein the particles of at least one getter materials have a size less than 150 μm.

4. The electrolytic capacitor according to claim 1, wherein the particles of at least one getter materials comprise less than 95 weight percent of the inner layer.

5. The electrolytic capacitor according to claim 4, wherein the weight percentage is less than 85%.

6. The electrolytic capacitor according to claim 1, wherein the at least one external protective layer and the inner layer each comprise a polymeric material selected from a polyolefin and polytetrafluoroethylene (PTFE).

7. The electrolytic capacitor according to claim 6, wherein the polyolefin is low-density polyethylene.

8. The electrolytic capacitor according to claim 6, wherein the at least one external protective layer and the inner layer comprise the same polymeric material.

9. The electrolytic capacitor according to claim 1, wherein the at least one getter material comprises a non-evaporable getter alloys selected from zirconium-vanadium-iron alloys and zirconium-cobalt-Rare Earth alloys.

10. The electrolytic capacitor according to claim 9, wherein the particles of at least one getter material have a size between 25 and 50 μm.

11. The electrolytic capacitor according to claim 9, further comprising a hydrogenation catalyst.

12. The electrolytic capacitor according to claim 9, wherein the at least one getter material is used together with a getter material for removal of $H_2O$.

13. The electrolytic capacitor according to claim 1, wherein the at least one getter material is an alkaline-earth metal oxide comprising calcium oxide.

14. The electrolytic capacitor according to claim 1, wherein the at least one getter material is used together with a getter material for removal of $CO_2$.

15. The electrolytic capacitor according to claim 1, wherein the at least one external protective polymeric layer has a thickness between 1 and 50 μm.

16. The electrolytic capacitor according to claim 15, wherein the thickness is between 2 and 20 μm.

17. The electrolytic capacitor according to claim 1, wherein the inner layer has a thickness between 5 and 200 μm.

18. The electrolytic capacitor according to claim 17, wherein the thickness is between 10 and 100 μm.

19. The electrolytic capacitor according to claim 1, wherein the multilayer polymeric sheet is located along at least one internal wall of the airtight housing.

* * * * *